(12) United States Patent
Theilgaard

(10) Patent No.: US 9,063,218 B2
(45) Date of Patent: Jun. 23, 2015

(54) POSITIONING SYSTEM AND METHOD

(75) Inventor: Niels Bo Theilgaard, Holstebro (DK)

(73) Assignee: Gamesontrack A/S, Holstebro (DK)

( * ) Notice: Subject to any disclaimer, the term of this patent is extended or adjusted under 35 U.S.C. 154(b) by 359 days.

(21) Appl. No.: 13/505,837

(22) PCT Filed: Nov. 4, 2010

(86) PCT No.: PCT/DK2010/050296
§ 371 (c)(1),
(2), (4) Date: Jul. 16, 2012

(87) PCT Pub. No.: WO2011/054358
PCT Pub. Date: May 12, 2011

(65) Prior Publication Data
US 2012/0274515 A1 Nov. 1, 2012

(30) Foreign Application Priority Data
Nov. 4, 2010 (DK) .................................. 2009 70190

(51) Int. Cl.
*G01S 3/02* (2006.01)
*G01S 5/30* (2006.01)

(52) U.S. Cl.
CPC ......................................... *G01S 5/30* (2013.01)

(58) Field of Classification Search
CPC ........................................................ G01S 3/02

USPC ........................................ 342/450, 463, 465
See application file for complete search history.

(56) References Cited

U.S. PATENT DOCUMENTS

| 6,141,293 | A | 10/2000 | Amorai-Moriya et al. |
| 2009/0187374 | A1 | 7/2009 | Baxter et al. |
| 2009/0251313 | A1* | 10/2009 | Perkins et al. ........... 340/539.13 |
| 2010/0081452 | A1* | 4/2010 | Guo et al. .................. 455/456.1 |

FOREIGN PATENT DOCUMENTS

| WO | WO 2006/102844 A1 | 10/2006 |
| WO | WO 2008/005931 A2 | 1/2008 |
| WO | WO 2009/022089 A1 | 2/2009 |

* cited by examiner

*Primary Examiner* — Harry Liu
(74) *Attorney, Agent, or Firm* — Knobbe Martens Olson & Bear LLP

(57) ABSTRACT

The present invention relates to a positioning system and method. The system and the method are particularly well-suited for indoor positioning of several idle objects or moving objects, preferably with very short time between two successive position determinations. According to the invention, two signals of different propagation velocities (preferably ultrasound and radio frequency) are sent out by an object. Alternatively, the radio signal can be sent out from a central unit. Preferably the transmission takes place simultaneously. Based on the time difference between reception of the two signals at two or more base receivers, the position of the object relative to the basic positions is determined.

9 Claims, 6 Drawing Sheets

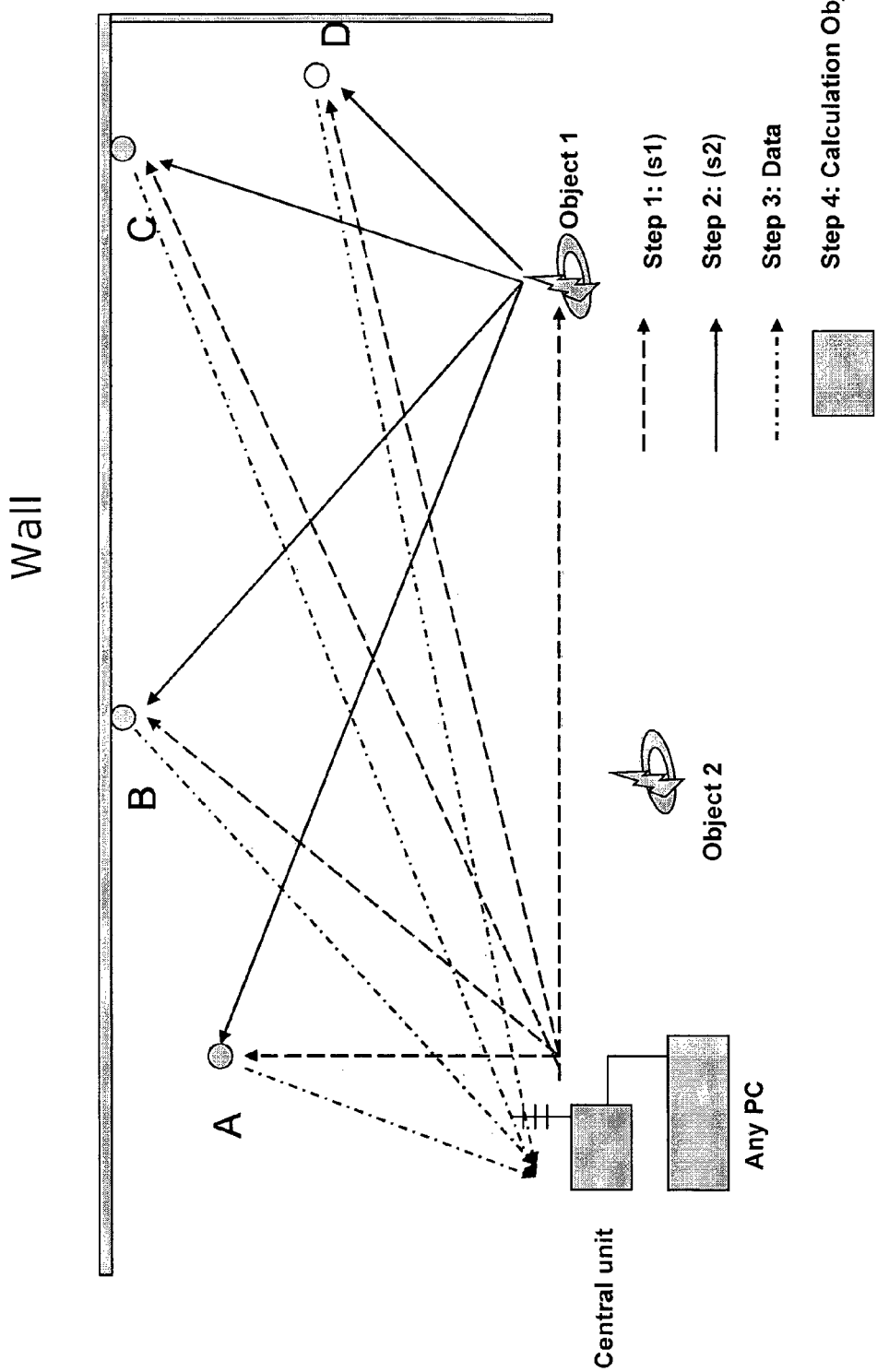

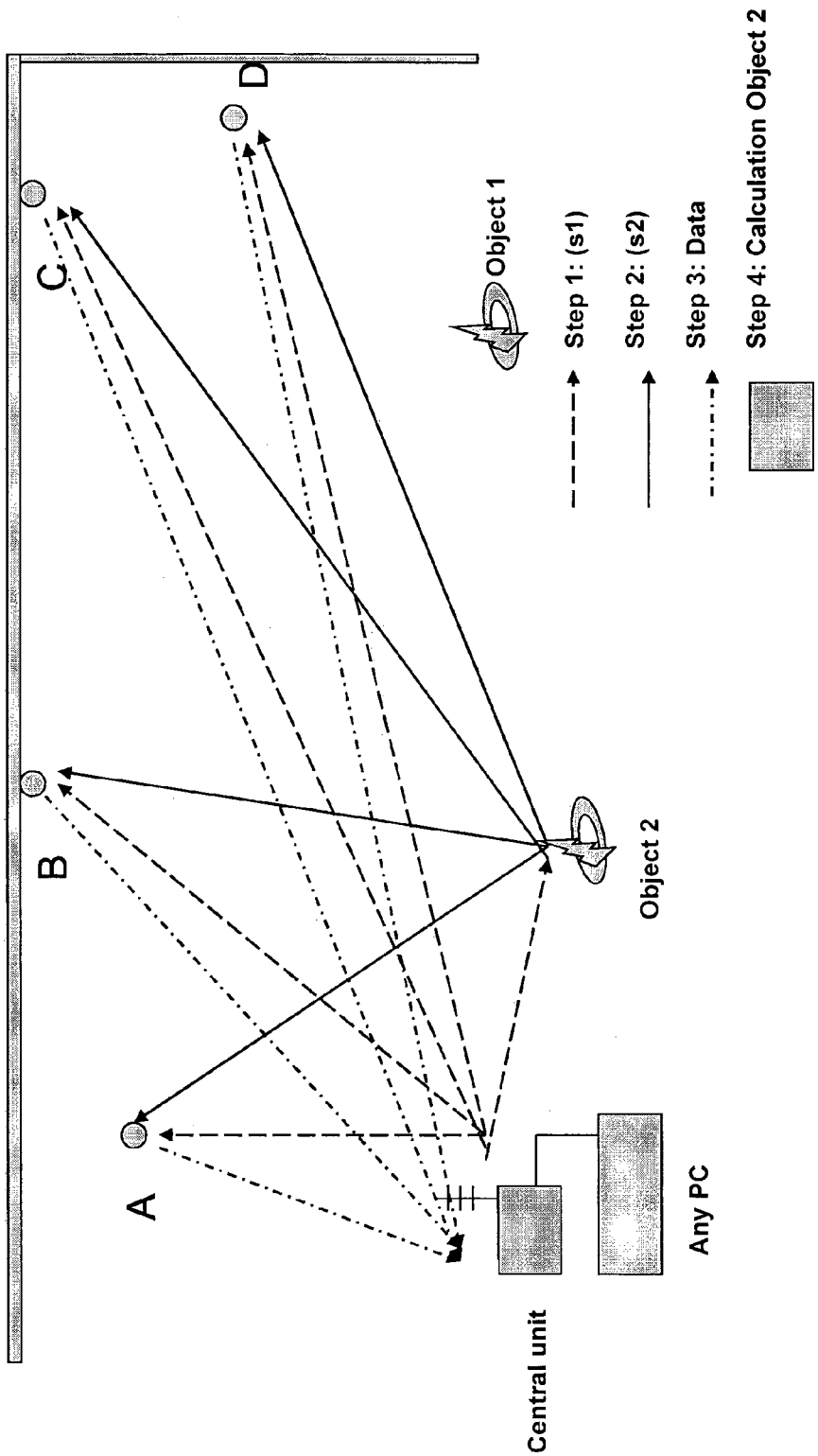

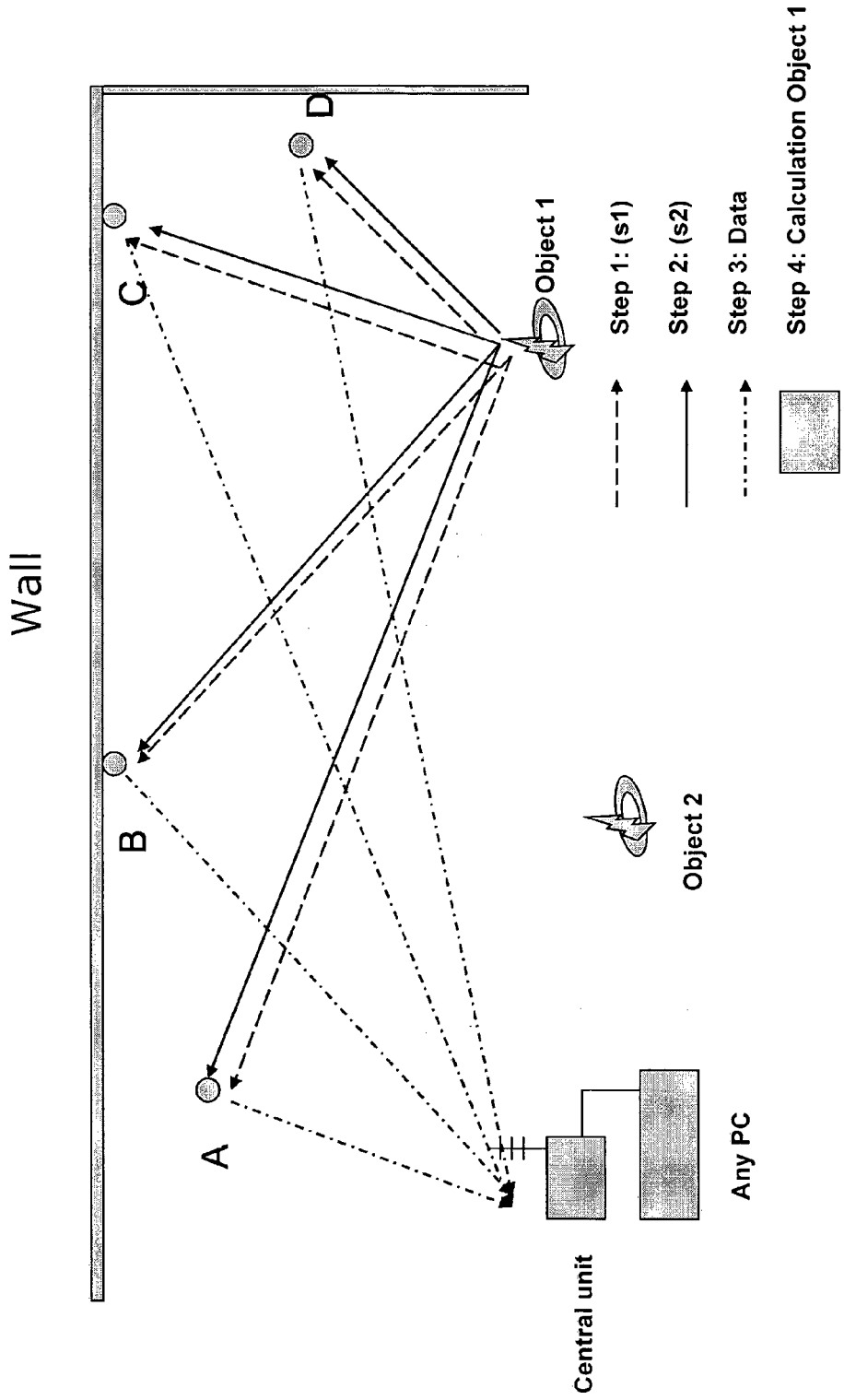

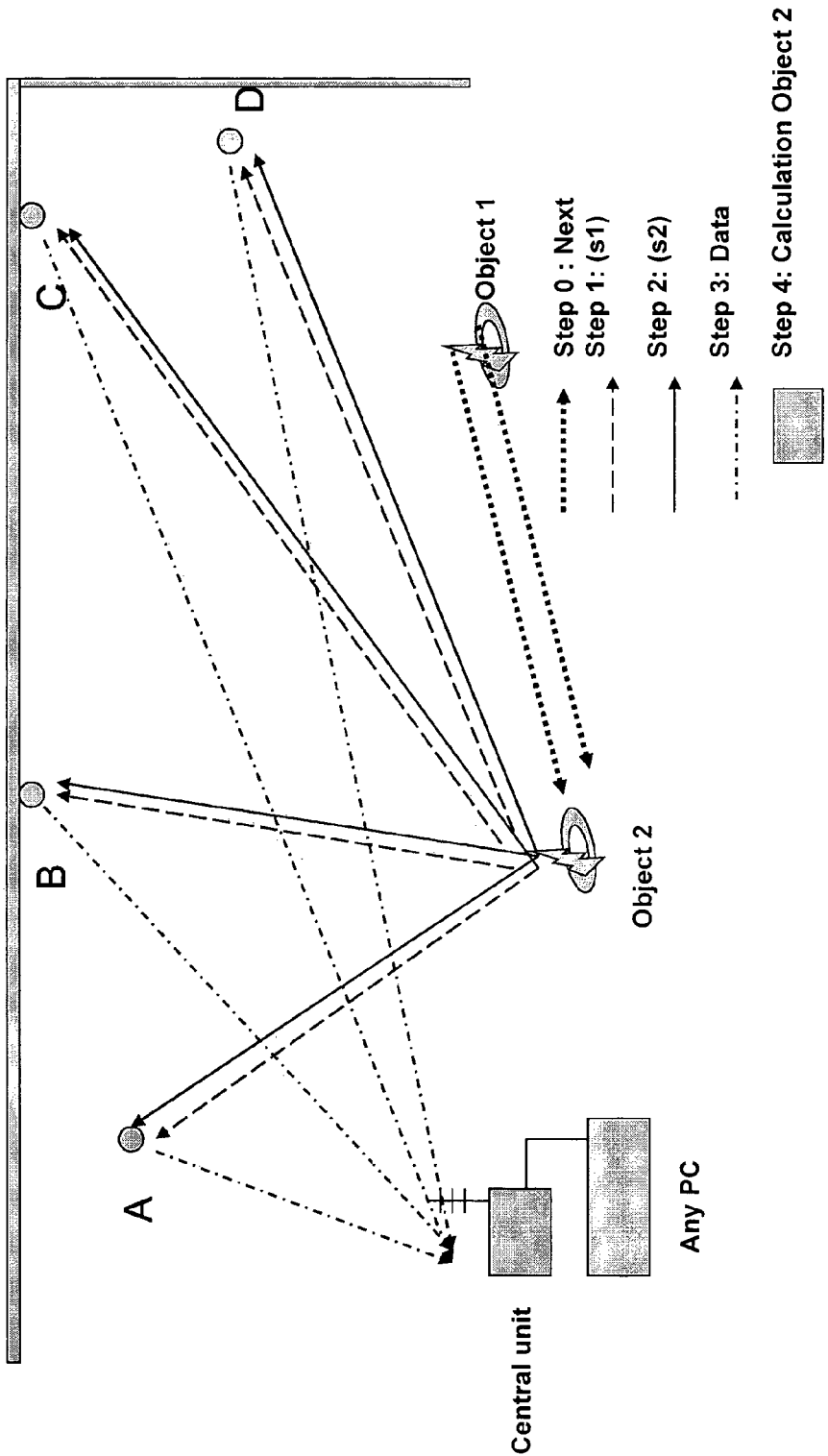

POSITIONING SYSTEM AND METHOD

CROSS REFERENCE TO RELATED APPLICATIONS

This application claims the benefit and priority to and is a U.S. National Phase Application of PCT International Application Number PCT/DK2010/050296, filed on Nov. 4, 2010, designating the United States of America and published in the English language, which is an International Application of and claims the benefit of priority to Danish Patent Application No. PA 2009 70190, filed on Nov. 4, 2009. The disclosures of the above-referenced applications are hereby expressly incorporated by reference in their entireties.

The present invention relates to a positioning system and method. The system and the method are particularly well-suited for indoor positioning of several idle objects or moving objects, typically with very short time between two successive position determinations.

The background of the invention is the need for combining the possibilities of the Internet for games and virtual worlds involving play and seriousness with physical robots, trains, toy tanks, wheel chairs, etc. on a floor. To be able to understand, play and guide each other via the Internet, you must know where you and everybody else are. This requires much more precision than what we operate with at present, and it requires that many objects can be positioned simultaneously and that objects can be positioned over longer distances than the range of one individual base receiver.

The object of the invention is to provide a positioning system which is sufficiently price effective, reliable and integretable to allow multiple applications. It can be part of playing, games/competitions, handicap and support applications across sectors. We will introduce this as a basis for replacement of imprecise positioning in the model railway and robot worlds.

It is known from (ref 1) US 2009/0187374 A1 (Baxter et al.) that positions of persons in a building can be determined in connection with game applications where controllers worn by players communicate with a computer. Time measurements are started and an ultra-sound signal and a radio signal are transmitted simultaneously from several basic points. When the radio signals are received by the controller, timers are started, which stop again when the controller receives the ultra-sound signals matching the radio signals whereby the time difference is returned to the central unit and the position is calculated. The central unit is connected to e.g. a PC with a screen so that the positions can be seen by the users.

Moreover it is known from (ref 2) WO 2006/102844 A1 (Matsushita Electric CO., LTD) that the ultra-sound signal and the radio signal can be transmitted from a random first node to a random second node. This is pointed out because the invention described below—contrary to ref 1—transmits from the moving object to the base receivers (several), whereas a timer is started when the radio signal is received. From each base receiver data is transmitted to the central unit and the position is determined.

In a first aspect, the invention relates to a method for determination of an object's position in relation to two or more basic positions, which method comprises:
- transmission of a first signal from either a transmitter placed on the object or from a transmitter placed externally, typically in a central unit, and a second signal from an object transmission system placed on the object, which transmission of signals preferably takes place simultaneously; the two signals are selected so that the propagation velocity of the first signal through the object's ambient atmosphere is substantially higher than the propagation velocity of the second signal, where the first signal is preferably a radio signal within the range of 700 MHz to 2.4 GHz and where the second signal is preferably an ultra-sound signal within the range of 30 kHz to 80 kHz;
- reception of the two transmitted signals with at least two base receivers, each placed in its own basic position in a given distance from each other
- determination of the time difference between reception of the two signals in each base receiver; determination of the time difference comprises start of a timer at reception of the first signal and stop of the timer at reception of the second signal, provided that the first signal and the second signal are each exceeding pre-defined threshold values for the other signal, preferably the ultra-sound signal, and
- calculation of the object's positions in relation to basic positions based on the specific time difference to precisely the base receivers which have captured the other signal with the highest strength.

In this context Receiver is typically applied in the sense of a device capable of receiving signals with two different propagation velocities. Typically such a receiver will comprise a radio wave receiver and an ultra-sound receiver.

Transmitter is in this context typically applied in the sense of a device capable of transmitting signals with two different propagation velocities. Typically such a transmitter will comprise a radio wave transmitter and an ultra-sound transmitter.

Threshold value is in this context typically applied as a lower limit value for a 2nd signal's signal strength, preferably an ultra-sound signal, below which value the signal is not applied for position measuring. For example because the signal is a reflected signal from a fixed object and not a primary signal from the transmitter. The threshold value is preferably applied together with the actual signal strength level for determining which base receivers should be applied for the position calculation.

It should be noted that even if the invention is described with focus on objects in motion, the invention can also be applied to idle objects such as objects shifting position in order to be idle for a shorter or longer period of time.

Another aspect of the invention relates to a positioning system for determination of several fixed or moving objects' positions in relation to two or more basic positions and thus also in relation to each other. Preferred embodiments and further aspects of the invention appear from the patent claims and the description of the invention.

The first and second aspect of the invention differ from the known methods described in ref 1 and ref 2 in that:
a) The invention operates with several (many) receivers all receiving the same radio signal and the same ultra-sound signal from an object and in that the choice of the two or three base receivers to be applied for the distance determination is made on the basis of the highest signal level of the second signal (ultra-sound signal) which is determined on the electronics level in the receivers. Hence the invention allows extension of the position system's range simply by setting up more base receivers.
b) And in that more driving objects are measured through the central allocating a time interval to the objects so that each object transmits its ultra-sound impulse at pre-defined times (e.g. every 200 ms) whereby the receivers know which object is being measured in. At the same time this allows prioritization of the objects. Each object has a unique ID. The size of the time internal can be set in relation to the velocity of the 2nd signal, the size of the room and the reflections and the capability of the electronics to measure the signal level of the 2nd signal.

Several of the invention's embodiments comprise a central unit with CPU, memory and radio communication which can control measuring and position calculation of several identified objects through time-sharing and prioritization in relation to basic positions and on the basis of the determined time difference and threshold values.

A substantial effect which can be obtained with the invention is a high degree of precision in position determination can be obtained through, among other things, the base receivers transmitting both calculated distance or time equivalent and the matching ultra-sound signal strength to the central unit.

The invention according to the first and second aspects is applicable in many ways and particularly applicable as stated below:

determination of the relative position of indoor driving or fixed objects typically with a precision of up to 1 cm. Driving objects can e.g. be self-propelled toy cars, model trucks, model tanks, robots or model trains.

determination of the positions of up to 20 driving objects within 1 second or 1 object every 50 ms.

mapping of routes on floor or tracks, drawing of routes or tracks on paper or on a computer in real time.

measuring of tracks and in a home it could be applied for e.g. controlling that an auxiliary robot is at a certain place or within reach.

identification of whether the objects subsequently pass or follow the already drawn routes, or pass fields manually or automatically drawn on a screen on top of the already drawn routes. Applied by e.g. model trains to determine when they approach a stop, a signal or an area with reduced speed.

positioning of e.g. model trains, cars, trucks and robots in relation to each other on a floor or in a room, so that games and tasks can be developed where the users can see each other, alternatively fire at each other, or collaborate with each other. For example passing a ball or another object from a robot arm on one object to a robot arm on another object. Or e.g. driving two objects into position so that they can jointly monitor or fire at a certain area.

applied for games and tasks, where the players use physical model trains, cars, robots, toy tanks and where they are either in the same room, each with their vehicles or in separate rooms each with their vehicles (or each in their town communicating over the Internet) so that e.g. virtual transport tasks where the game assignment is placed on the Internet and where the players are physically to drive routes and tasks together. Or should avoid obstacles placed virtually in the game plan or physically on the user's floor.

applied by disabled or elderly/sick people needing help from another person or a robot, where the precise position of e.g. a pillbox, a tool, an aid, a wheel chair, etc. must be known. It is, for example, possible to remote-control a wheel chair when the position in the home is known and can be read on a screen remote.

the absolute precision of the system can be disturbed by persons or components blocking the line of sight between object and receiver. If these are fixed objects, then the system will draw a route deviating from the absolute geometrically correct route/position. But the system will do this equally wrong each time and will still be capable of determining the relative position in relation to the drawn route with the fixed object. Therefore the routes of the system must be "calibrated"/adjusted, if the position of the fixed components on e.g. a game plan is changed.

if persons or other mobile components get "in the way" then one or more receivers will show weaker signals and the system can automatically connect to other receivers. Therefore dynamic disturbances can be compensated for through the application of several receivers in several positions.

the best effect with a minimum of hardware is obtained with receivers positioned where wall and ceiling meet.

In the following the invention and especially preferred constructional embodiments will be described more in detail with reference to the figures.

BRIEF DESCRIPTION OF THE FIGURES

FIG. 1a, FIG. 1b, schematically illustrates the overall mode of operation and elements of the invention.

In step 1 the central unit transmits a controlling radio signal to Object 1 and Object 2 time-delayed. The radio signal is received simultaneously by all receivers A-B-C-D. If the time sharing is e.g. 50 ms to each, a radio signal is transmitted in time 0 to Object 1 in FIG. 1a, 50 ms later to Object 2 in FIG. 1b, and after another 50 ms to Object 1 again etc. The below steps 2-4 are performed for each cycle.

In Step 2 Object 1 s2 transmits (preferably the ultra-sound signal) which is received by each base receiver with different time delays and signal strengths.

In Step 3 each base receiver transmits the calculated time difference or equivalent distance back to the central unit.

In Step 4 the central unit or the attached PC calculates the XY or XYZ position based on which base receivers had the highest signal strength. When the calculation has been completed and may be transferred to the computer, the procedure is repeated from Step 1. Selection of which Object to measure in the subsequent Cycle is controlled by the PC or the central unit.

FIG. 2a-b illustrates the same method as FIG. 1a-b with the difference that the order of the objects is fixed whereby the control of and transmission of the radio impulses takes place from the radio in Object 1 instead of from the central unit (Step 0). Hereby the position measuring is trigged by a controlling object for all other objects which together with the radio signal transmit the ID of the active object.

Figure 3:
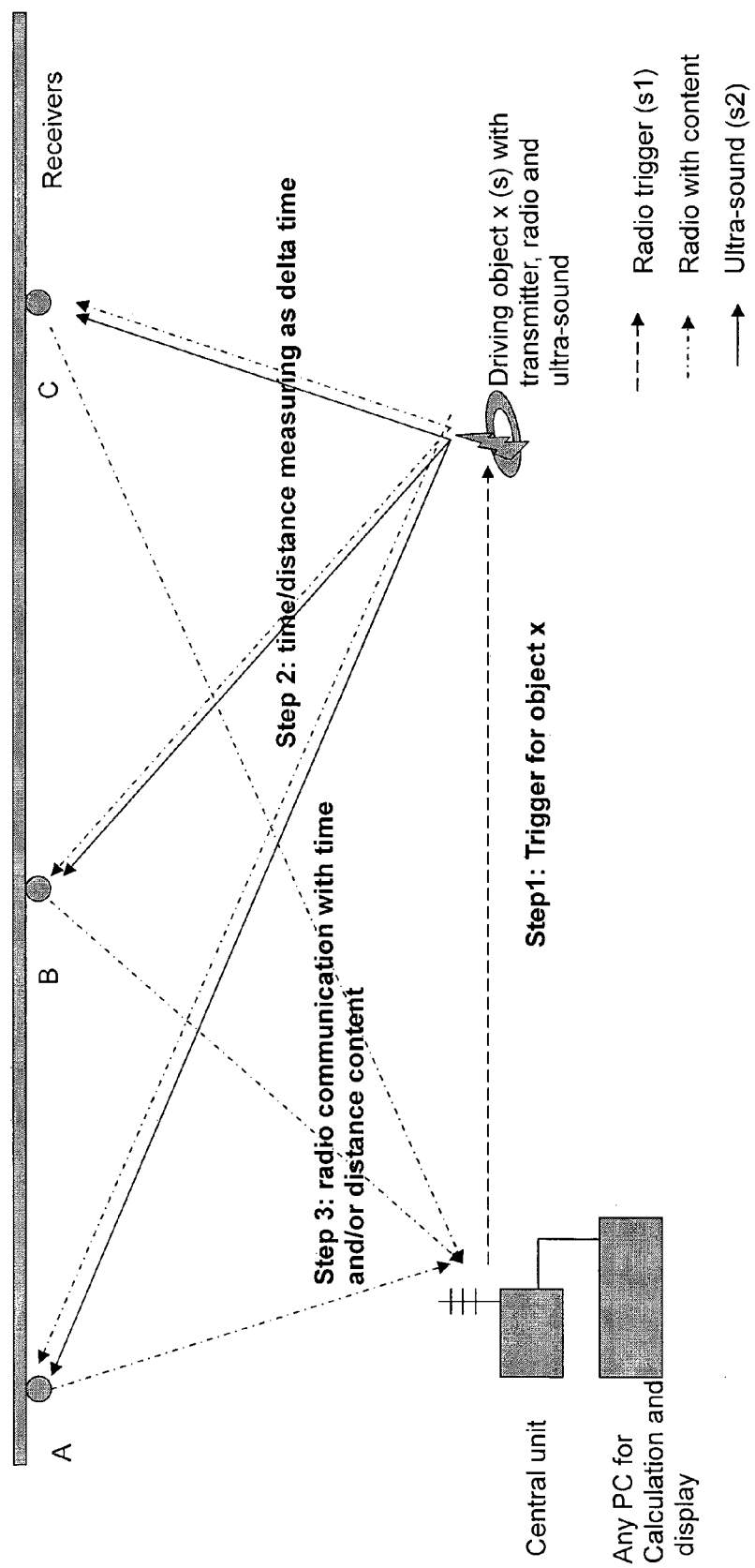
Figure 4:
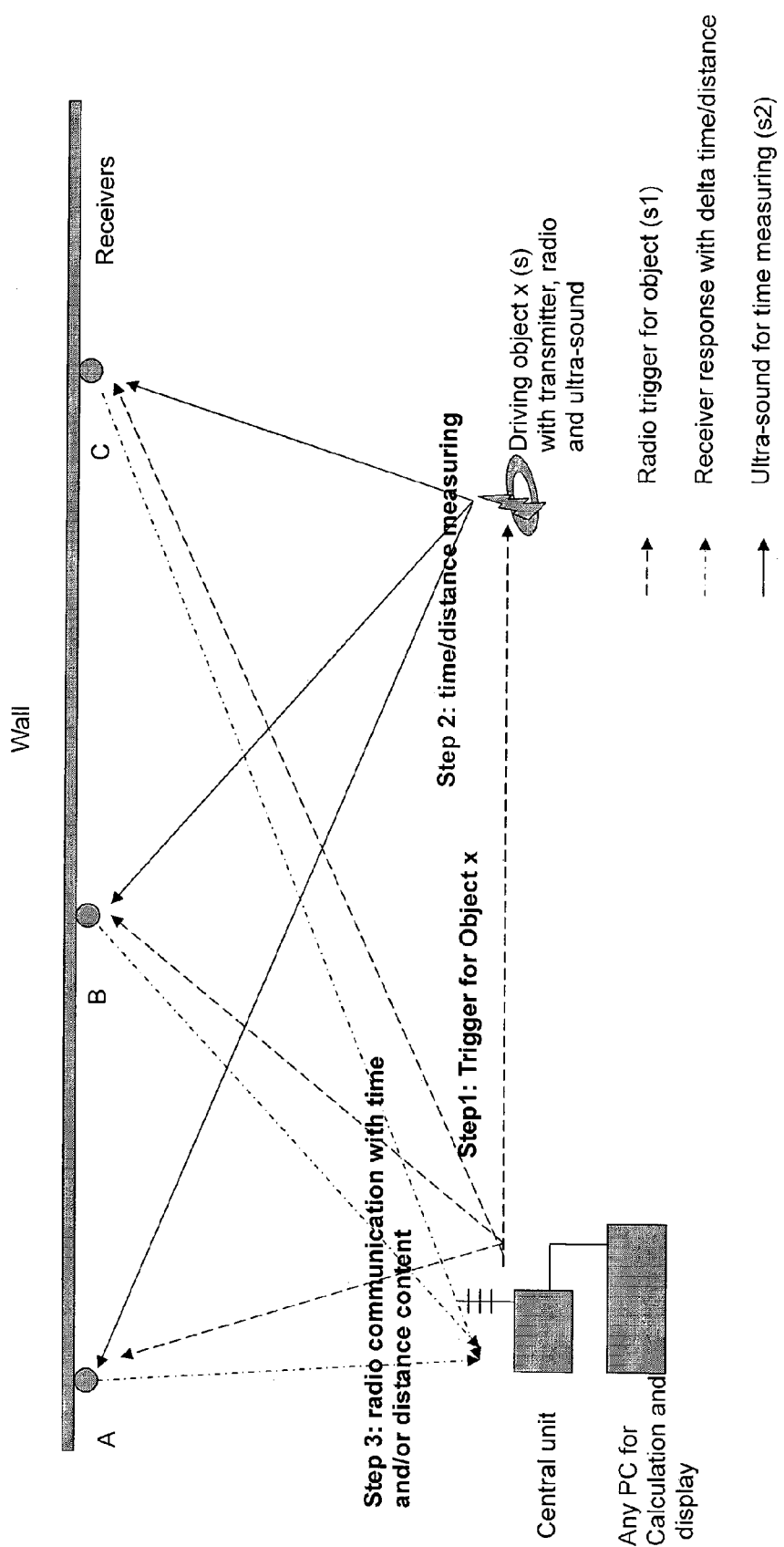

FIGS. 3 and 4 illustrate a further embodiment of the invention: FIG. 3 illustrates schematically the mode of operation and elements, where the object also transmits the radio signal by means of trigging; FIG. 4 illustrates schematically the mode of operation and elements, the receivers receive the radio signal from the central unit and only the ultra-sound signal from the object. In both figures, B and C receive the strongest signal and are applied for calculation. Other receivers can assist in precisioning or compensating for obstacles, provided that the signal is good enough. All three steps can e.g. be performed for at least 20 objects per second or for 1 object 20 times/second.

DESCRIPTION OF PREFERRED EMBODIMENTS OF THE INVENTION

FIGS. 1a-b and 2a-b schematically illustrate the overall mode of operation and elements of the invention. Objects to be position-determined comprise an electronic transmission system, transmitting signals $s_1$ and $s_2$ on two frequencies with two different propagation velocities, trigged and time-determined by an overall central system.

The receiver system is made of two or more base receivers A, B, C, D . . . set up so that the signals transmitted from the object's electronic transmission system are received with sufficiently high signal strength by each receiver A, B, C, D . . . Whether a given signal is received with sufficiently high signal strength is determined by comparing the received signals with pre-determined threshold values S2 for s2 (the ultra-sound signal). In this context 'With sufficiently high signal strength' means that the strength is high enough to obtain a time difference calculation which can be detected by the electronics.

In several situations some of the base receivers A, B, C, D . . . will receive signals above the threshold values and other receivers will either not receive the signals at all or will receive signals below the threshold values. In such cases the system will preferably base the position determination solely on signals above the threshold values and in this way sort out the remaining receivers in the position determination.

If several qualified signals are above the threshold values, the strongest ones are applied and the remaining ones above the threshold values contribute to either further precisioning (middling) or as compensation for obstacles.

This means that the receiver system calculates distances and signal strength to a specific object in the transmission system. In connection with laying out of the positioning system, the distance between base receivers A, B, C, D . . . and the positions where objects in the transmission systems may be placed is taken into consideration which means that if the distances between the base receivers become too long, more base receivers will be added in order to guarantee that at least two base receivers A, B, C, D . . . can receive signals above the threshold values. The precise distance between the base receivers is measured manually or automatically. The base receivers transmit the measuring results in the form of time differences or time differences converted into distances and object ID to a central unit via radio or via wiring.

The total system is trigged by radio impulses from the central unit, which initiates when each of the driving objects transmits its signal. In this way several driving objects share a time interval e.g. a second, so that the entire system can measure positions of e.g. 10 driving objects per second. The central unit receives all distance measurements and transmits such measurements via a fixed connection e.g. a USB cable to a PC.

The central unit or a computer program executed in a computer in data communication with the central unit calculates the relative position of each object on the basis of known trigonomic calculations. A selected base receiver is interpreted as a 0 point and two base receivers placed on e.g. a wall form a basic line and 3 receivers form a plan. Two receivers can make a precise relative position measurement from the 0 point if the object is driving on a plane floor and is within reach because the height from floor to basic line is known.

Transmission System of the Objects

The transmission system of the objects comprises a small radio transmitter and receiver communicating in the area of one of the ISM bands: 433 MHz, 868/915 MHz, or 2.4 GHz. The object transmission system also has a low frequency transmitter, e.g. an ultra-sound transducer: 25 KHz to 125 KHz. Preferably 40 KHz is applied. The ultra-sound transducer transmits an ultra-sound signal simultaneously with the radio. The ultra-sound signal reaches the base receivers at a later time than the radio signal. The time difference in the reception of the two signals is read by the base receiver. The transmission system of the objects transmits its two signals simultaneously controlled by a radio impulse from the central unit.

A basic measuring principle is that a radio message is transmitted from the central unit with the information that a position measuring of a specific driving unit is requested. This signal is captured by all receivers and thus also the specific object at the same time (within 0.5 us). The receivers record the time of reception of the radio message. Immediately after reception of the radio message, an ultra-sound signal of a duration of approx. 5 ms is transmitted by the specific transmitter. Based on the time when the ultra-sound signal reaches the receivers, the distance between transmitter and each individual receiver is determined (the velocity of sound is approx. 340 meters per second). In addition to the receivers recording the time of reception of the ultra-sound signal, the signal strength of the ultra-sound signal is recorded as well.

The invention therefore comprises two different ways of handling the radio signals, FIG. 1a-b and FIG. 2a-b. A first method comprises that both a radio signal and an ultra-sound signal are transmitted from a driving unit (FIG. 2a-b) and that the transmission of these two signals is triggered by the fact that the driving unit receives a radio signal from the central unit or just starts when it is turned on (in this case too, the propagation velocity of the radio signal is set to zero). A second method (FIG. 1a-b) comprises that the central unit transmits a radio signal which is applied for initiating the timing of the ultra-sound signal propagation from the driving unit to the receiver (the propagation velocity of the radio signal is set at zero).

The ultra-sound signal strength is applied for 2 purposes:
1. Determination of whether the signal is of a sufficient quality (level) to ensure a precise distance measurement.
2. Compensation for the extra delay in detection of the signal which occurs due to the settling time in transducer as well as analog dectector circuit.

The transmission systems of the objects are powered by a battery on the driving unit (e.g. if this is a self-propelled robot) or if the transmission system is placed on e.g. a model train from the track power system. The antenna of the radio can be a small wire of 2-3 cm or a copper track direct on the print.

Precision is obtained by the transducer's free beaming into the space with no limitation or by the transmission of the beaming through a small hole of the size of approx. 4-8 mm in diameter, whereby the propagation height is limited and a longer horizontal range is obtained—like a sort of sausage. The thickness of the material and the size of the hole determine the shape of the propagation.

Base Receivers

The base receivers comprise ultra-sound transducer, analog detector circuit, radio transmitter/receiver and a small processor. The radio records that a signal from a given object with a specific unique address has been transmitted and waits for the ultra-sound receiver to receive the corresponding ultra-sound signal. The time difference between the two signals is calculated mathematically in the processor.

The analog detector circuit comprises: High amplification (approx. 80 dB/10,000 times) of signal from transducer. The amplification of the ultra-sound signal is adjusted to the ultra-sound frequency 18 dB/octave—bandpass). After intensive amplification of the signal, it is double-rectified and filtered.

From the analog detector two signals are passed on to the micro-processor:
  The double-rectified and filtered signal (in the following called signal A) is applied for determination of the time of a received signal.
  A single-rectified (and filtered signal) which has only been strengthened approx. 55 dB (approx. 300 times).

Applied for determination of the signal strength (hereinafter called signal B).

The micro processor comprises the following components:

Timer (counters): Applied for precise determination of the time from radio signal to ultra-sound signal.

Analog comparator: Applied for precise determination of the time when a given level of signal A is reached.

Analog to digital converters: Applied for measuring the level of signal B.

In practice the electronics have the effect that the ultra-sound signal occurs for a certain time period. Due to the large gain a sufficient precision is obtained by simply detecting the ultra-sound signal, when it is higher than a given threshold. The obtained time delay is insignificant (in contrast to other normal standards preconditioning that the signal duration must be compared by means of a curve slope and its cut on the time axis must be calculated). This allows the use of less expensive components.

The processor calculates the distance based on the knowledge of the two frequencies and transmits the distance A and signal strength B for the ultra-sound signal for the given object to the central unit via the radio. The antenna of the radio can be a small wire of 8-10 cm or a copper lane on the print.

The receiver is powered by a standard net adaptor or e.g. by the track power in case of model trains.

With the given components operating distances of up to 8 m between transmitter and receiver are applied and a precision of max. 1 cm deviation on two successive measurements from the same point.

The Central Unit

Via the radio the central unit captures the distances to the driving objects in each time interval, which with the selected equipment goes down to approx. 50 ms, that is up to 20 objects per second. The central unit has a small processor which controls the radio impulses triggering a measurement of an object and captures all distances from all objects via the radio. The central unit controls the system and handles the following tasks:

collection of information about 'new' receivers and transmitters, that is when a new driving/fixed object is set in, this is recorded automatically based on the unique address and the system starts automatically to measure the new object.

distribution of time intervals to the position measurements for each individual transmitter. On the basis of earlier measurements it is decided whether each individual unit is moving at present. The distance is measured more frequently on moving units.

collection of measuring data from the receivers and any further geometric calculations, please see below.

transfer of measuring data to PC.

The central unit can either:

a) Solely make the trigonometric calculations based on entered distances between the receivers and show X-Y-Z coordinates relatively in relation to 0 point, basic line or basic plan. In that case the central unit has a stronger processor than the one described in the diagram.

b) Transmit all distance data in real time to the PC via e.g. a USB interface where the PC will make the trigonometric calculations and plot X-Y-Z data in real time, either as table information or as a direct graphic view in a coordinate system. In this way it becomes possible to for example draw the driving objects' tracks and routes, relatively to 0 point, basic line and plan.

The calculation program which can either be stored in the PC or locally in the central unit—or in another central unit e.g. an industrial computer—exploits that the receivers pass on the ultra-sound signal's strength to the central unit together with the distance, so that, in case of more possible receivers, the program can assess and apply the receivers with the highest signal strength and thus the highest precision.

The invention claimed is:

1. A method for determination of an object's position in relation to two or more basic positions, comprising:

transmission of a first signal from either a transmitter placed on the object or from a transmitter placed externally in a central unit, and a second signal from a transmission system placed on the object, wherein the two signals are selected so that the propagation velocity of the first signal through the object's ambient atmosphere is substantially higher than the propagation velocity of the second signal, wherein the first signal is a radio signal within the range of 700 MHz to 2.4 GHz and wherein the second signal is an ultra-sound signal within the range of 30 kHz to 80 kHz;

reception of the two transmitted signals with at least two base receivers, each placed at one of the two or more basic positions at a given distance from each other;

determination in each base receiver of a signal level of the second signal received in the given base receiver;

determination of the time difference between reception of the two signals in each base receiver; wherein determination of the time difference comprises start of a timer at reception of the first signal and stop of the timer at reception of the second signal, provided that the first signal and the second signal are each exceeding pre-defined threshold values, and calculation of the object's position in relation to the basic positions by selecting two or more base receivers having the highest signal levels and being above a pre-defined threshold value for the second signal defining a lower limit value below which the second signal is not applied for position determination on the basis of the specific time difference, wherein a choice of the two or more base receivers to be used in the determination of the time difference is made on the basis of a highest signal level of the second signal and calculating the object's position on the basis of the determined time differences and the basic positions of the selected two or more base receivers.

2. The method according to claim 1, wherein transmission of the first and the second signal is initiated by a time sharing and identification of each object controlled from the central unit.

3. The method according to claim 1, wherein the initialization signal comprises an identification, which uniquely identifies a given transmitter and, wherein the method comprises detection of the received initiation signal from the transmission systems and transmission of at least one other signal if an object transmission system detects a match between the initiation signal and the object transmission system's identification.

4. The method according to claim 1, wherein the ultra-sound signal is transmitted from the ultra-sound transmitter through a given geometric construction in the transmitter through which the ultra-sound signal is transmitted via the transmission system, so that the signal strength is concentrated in the direction of the receivers.

5. The method according to claim 1, wherein the distance from an object to a given base receiver is calculated on the basis of an assumption that the first signal is received simultaneously with the transmission of such signal and the distance in this connection is calculated substantially as the propagation velocity of the second signal multiplied by the time lapse between reception of the first and the second signal.

6. A positioning system for determination of an object's position in relation to two or more basic positions, comprising:
one or more transmitter(s) either placed on the object and/or placed externally of the object in a central unit and, wherein said transmitter is adapted for transmission of a first signal;
a transmission system placed on the object for transmission of a second signal, wherein the first signal is a radio signal within the range of 700 MHz to 2.4 GHz and, wherein the second signal is an ultra-sound signal within the range of 30 kHz to 80 kHz; wherein the transmission of signals takes place simultaneously and the selection of the two signals is such that the propagation velocity of the first signal through the objects ambient atmosphere is substantially higher than the propagation velocity of the second signal;
a number of base receivers each placed at one of the two or in its more basic positions at a given distance from each other for the reception of the two transmitted signals;
a detector in each base receiver adapted to determine a signal level of the second signal received in the given base receiver; and
a computer adapted to determine the time difference between reception of the two signals in each base receiver and a detector for determination of the second signal's strength; wherein determination of the time difference comprises start of a timer at the reception of the first signal and stop of the timer at the reception of the second signal, provided that the first signal and the second signal both exceed pre-defined threshold values, wherein
the computer is further adapted to calculate the object's position in relation to the basic positions by selecting two or more base receivers having the highest signal levels and being above a pre-defined threshold value for the second signal defining a lower limit value below which the second signal is not applied for position determination on the basis of the specific time difference, wherein a choice of the two or more base receivers to be used in the determination of the time difference is made on the basis of a highest signal level of the second signal and calculating the object's position on the basis of the determined time differences and the basic positions of the selected two or more base receivers.

7. The positioning system according to claim 6, wherein the central unit includes or is connected to a screen displaying X-Y-Z positions and the driven routes of all objects in real time.

8. The positioning system according to claim 6, wherein the objects are model trains, whereby identification and control of each train's movements and positions and passages of manually drawn sections on the screen on top of the automatically drawn track plan.

9. The positioning system according to claim 6, wherein the objects are self-propelled trains, robots and cars; whereby the same objects' routes and positions are applied for control of task solving or games in relation to a task plan or game plan on a screen.

* * * * *